United States Patent
Atanasyan

(10) Patent No.: US 6,293,260 B1
(45) Date of Patent: Sep. 25, 2001

(54) METHOD AND DEVICE FOR REGENERATING A FUEL VAPOR FILTER FOR A DIRECT INJECTION ENGINE

(75) Inventor: Alain Atanasyan, Pibrac (FR)

(73) Assignee: Siemens Automotive S.A., Toulouse-Cedex (FR)

( * ) Notice: Subject to any disclaimer, the term of this patent is extended or adjusted under 35 U.S.C. 154(b) by 0 days.

(21) Appl. No.: 09/367,200

(22) PCT Filed: Feb. 6, 1998

(86) PCT No.: PCT/EP98/00666

§ 371 Date: Aug. 9, 1999

§ 102(e) Date: Aug. 9, 1999

(87) PCT Pub. No.: WO98/35154

PCT Pub. Date: Aug. 13, 1998

(30) Foreign Application Priority Data

Feb. 7, 1997 (FR) .................................................. 97 01593

(51) Int. Cl.[7] .................................................. F02M 33/02
(52) U.S. Cl. ............................................ 123/520; 123/295
(58) Field of Search .................... 123/520, 518, 123/519, 295, 302, 432, 533

(56) References Cited

U.S. PATENT DOCUMENTS

| | | | |
|---|---|---|---|
| 5,245,975 | * | 9/1993 | Ito ........................................ 123/520 |
| 5,248,974 | * | 9/1993 | Watson et al. ....................... 123/518 |
| 5,273,020 | | 12/1993 | Hayami ................................ 123/520 |
| 5,377,644 | * | 1/1995 | Krohm ................................. 123/516 |

FOREIGN PATENT DOCUMENTS

4316728A1  3/1994  (DE).
0488254A1  6/1992  (EP).

\* cited by examiner

*Primary Examiner*—Henry C. Yuen
*Assistant Examiner*—Mahmeud Gimie
(74) *Attorney, Agent, or Firm*—Herbert L. Lerner; Laurence A. Greenberg; Werner H. Stemer

(57) ABSTRACT

The present invention relates to a process for regenerating a fuel vapor filter for a direct injection engine, and to a corresponding device. The process according to the invention comprises the following steps, while the engine is running on stratified charge:

authorizing the purging of the fuel vapor filter (18), letting the fuel vapors into at least one of the cylinders (11), and performing homogeneous combustion in the cylinder receiving the fuel vapors.

The invention also relates to a corresponding device (24). This device comprises, in particular, a pump (19) allowing the fuel vapors to be circulated from the filter (18) to the cylinders (11).

7 Claims, 1 Drawing Sheet

METHOD AND DEVICE FOR REGENERATING A FUEL VAPOR FILTER FOR A DIRECT INJECTION ENGINE

BACKGROUND OF THE INVENTION

1. Field of the Invention

The present invention relates to a process and to a device for regenerating a fuel vapor filter for a direct injection engine.

2. Description of the Related Art

It is already known practice for motor vehicles to be fitted with fuel vapor filters. These filters are intended to collect and store the fuel vapors that are present in the vehicle tank. There are numerous factors which may be involved in creating these vapors—for example, the fact that the vehicle tank is partially empty and that the vehicle is standing in full sunshine. These vapors may alternatively be due to the fact that when the vehicle is in operation, excess fuel is sent to the injection line set. This excess fuel heats up in contact with the engine and then returns to the tank. Its entry into the tank creates fuel vapors.

The standards currently in force demand that vehicles must not emit fuel vapors. For this purpose, an active charcoal filter is associated with the tank so as to collect any fuel vapors. Of course, for this filter to operate in the optimum way, it has to be regenerated when saturated.

The purpose of the present invention is to regenerate such a filter installed on a direct injection engine.

When this filter is installed on a conventional indirect injection engine, the fuel vapors are conveyed to the inlet port upstream of the cylinders. Here, these vapors mix with the air and fuel injected and are then drawn into the cylinders when the inlet valves open.

By contrast, when such a fuel vapor filter is installed on a direct injection engine, a problem in introducing the fuel vapors into the cylinders arises since the combustion process differs.

For a direct injection engine to operate at optimum efficiency, it needs to operate as often as possible with what is known as stratified charge. In this type of combustion, the cylinder is filled with air when the inlet valve opens. Fuel is injected into the cylinder in the region of the spark plug so as to encourage the mixture to detonate at this point. However, as the distance from the spark plug increases, the richness of the mixture decreases until only air is present. There are thus a great many layers or "strata" of different richnesses within the cylinder. The layers closest to the spark plug are rich in fuel; the layers further away consist of what is known as a lean mixture. Stratified charge combustion makes it possible to ensure that the mixture will detonate and makes it possible to ensure, that as far as the cylinder as a whole is concerned, there is an excess of air, which greatly reduces the emissions of pollutants. Furthermore, this type of combustion makes it possible to minimize the amounts of fuel employed, and therefore to decrease the fuel consumption of the engine.

Now, for an engine to operate correctly on stratified charge, it is necessary for the inlet throttle valve to be opened as wide as possible so as to be able to operate with excess air. As a result of this, the inlet depression is very small, and this causes complications in conveying the fuel vapors toward the cylinders. The problem is that with no inlet depression, the fuel vapors are not correctly drawn in toward the cylinders. There is even a risk that these vapors might leave the vehicle through the air inlet pipe. Such a process would lead to even greater pollution, which would go completely against the desired objective.

European Patent Application EP 0 488 254 (TOYOTA) relates to an internal combustion engine of the direct injection type. This engine comprises a fuel vapor filter. This filter is regenerated when the engine is under heavy load and is running with a homogeneous charge in all cylinders. No regeneration is performed when the engine is running on stratified charge or at light load or when the catalytic converter has not reached its operating temperature (at start-up). What this means is that the filter is not regenerated at the appropriate instant (particularly on start-up because, throughout the time that the engine is not running, large quantities of vapor may accumulate in the filter). This document suggests no satisfactory solution for regenerating the fuel vapor filter during operation in stratified charge mode.

SUMMARY OF THE INVENTION

The purpose of the present invention is to create a process for regenerating a fuel vapor filter for a direct injection engine operating on stratified charge. This process must not disturb the operation of the engine or must disturb it very little and must not increase the fuel consumption, which is the major advantage of stratified charge combustion. The invention also proposes a corresponding device for regenerating the filter without emitting fuel vapors directly into the atmosphere.

To this end, the present invention relates to a process for regenerating a fuel vapor filter for a direct injection engine of the type comprising:

a number of cylinders supplied directly with fuel, a filter designed to collect the fuel vapors at a fuel tank, a fuel vapor discharge line fitted with a discharge valve, said discharge valve being equipped with a pump designed to discharge the fuel vapors stored in the filter and to convey these vapors toward the cylinders.

The process according to the invention comprises, while the engine is running on stratified charge, the following steps:

authorizing the opening of the fuel vapors discharge valve when the degree of saturation of the filter exceeds a given threshold, letting said vapors into at least one of the cylinders, and homogeneous combustion of these vapors in this cylinder.

The present invention also relates to a device for regenerating a fuel vapor filter for an internal combustion engine, comprising:

a fuel vapor filter designed to store the fuel vapors originating from a fuel tank, a fuel vapor discharge line designed to collect the fuel vapors originating from the filter and convey them to the immediate vicinity of the cylinders, a discharge valve mounted on the fuel vapor discharge line in the vicinity of the cylinders, and a fuel vapor discharge pump designed to cause said vapors to circulate between the filter and the cylinders.

Such a process ensures complete combustion of the fuel vapors without appreciably disturbing the operation of the engine on stratified charge. Advantageously, the process according to the invention further comprises steps of monitoring the engine torque and of modifying this torque for the cylinder receiving the fuel vapors. Specifically, since this cylinder (or these cylinders) is the site of homogeneous rather than stratified charge combustion, the torque created by this cylinder may differ from the torque of the other cylinders. In consequence, when the torque of the cylinder receiving the fuel vapors is higher than the torque from the other cylinders, the spark plug ignition instant for this cylinder is managed so as to obtain a torque similar to the torques from the other cylinders. The objective is to make sure that the homogeneous-charge combustion disturbs the cylinders operating on stratified charge as little as possible.

It is also possible to alter the amount of fuel injected into the cylinder using homogeneous combustion, in order to alter its torque, if the torque is too low compared with that of the other cylinders.

Further objectives, features and advantages of the present invention will in any case become clear from the description which follows, by way of nonlimiting example and with reference to the appended drawings in which:

DESCRIPTION OF THE PREFERRED EMBODIMENT

Figure 1:
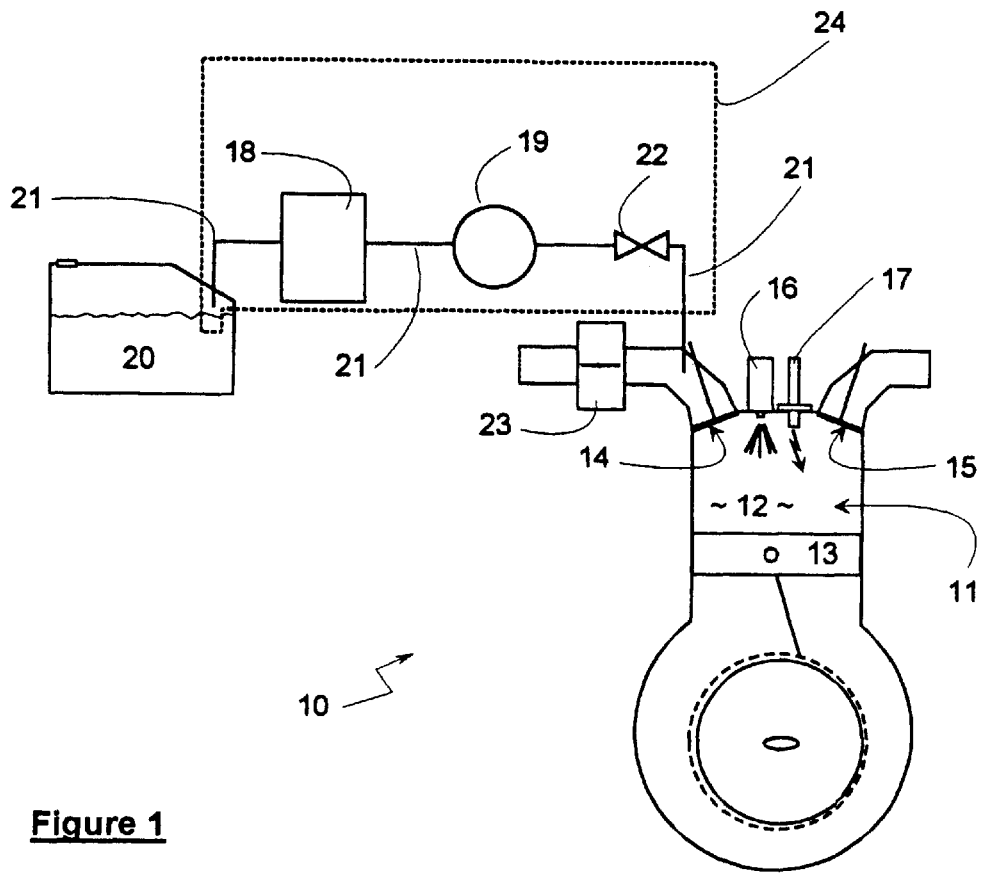
FIG. 1 is a diagrammatic view of a direct injection engine operating on stratified charge.

A reminder of the way in which an engine with direct fuel injection operates will first of all be given, with reference to FIG. 1.

An engine 10 with direct fuel injection comprises, in the conventional way, a number of cylinders 11 (just one is depicted in FIG. 1).

Each of these cylinders 11 comprises a combustion chamber 12 and a piston 13 driving the rotation of a drive shaft. Inlet valves 14 and exhaust valves 15 provide control over the flow of air and of gas entering and leaving the chamber of the cylinder. A fuel injector 16 conveys a determined amount of fuel directly into the combustion chamber. A spark plug 17 provides a spark, at an appropriate moment, to initiate the detonation of the mixture. The burnt gases are then discharged through the exhaust valve 15.

In the case of a direct injection engine, a determined amount of fuel is conveyed, at the end of the air inlet phase, into immediate proximity to the spark plug, so that the richness in this zone is higher than in the rest of the combustion chamber.

The combustion chamber is thus filled with mixture the richness of which decreases gradually with increasing distance from the spark plug. There are therefore a number of layers (strata) of gases of decreasing richness inside the combustion chamber. When the spark detonates the mixture, the flame front starts out from the spark plug and propagates, thereafter, through the chamber. The mixture contained in the cylinder is burnt in the presence of an excess of air, and this guarantees complete combustion of the fuel present in the chamber. Combustion of this kind is known as stratified charge combustion.

In the context of a direct injection engine, it is always preferable to operate with a stratified charge, because pollution is reduced as also is the fuel consumption, while the engine torque is at a maximum.

However, this type of combustion entails the obligation to maintain a throttle valve 23 in the wide open position almost constantly. A result of this is that the suck of the engine during the induction stroke is very low.

Where a fuel vapor filter 18 needs to be regenerated, it is therefore necessary to provide a suction system, namely a pump 19.

Figure 2:
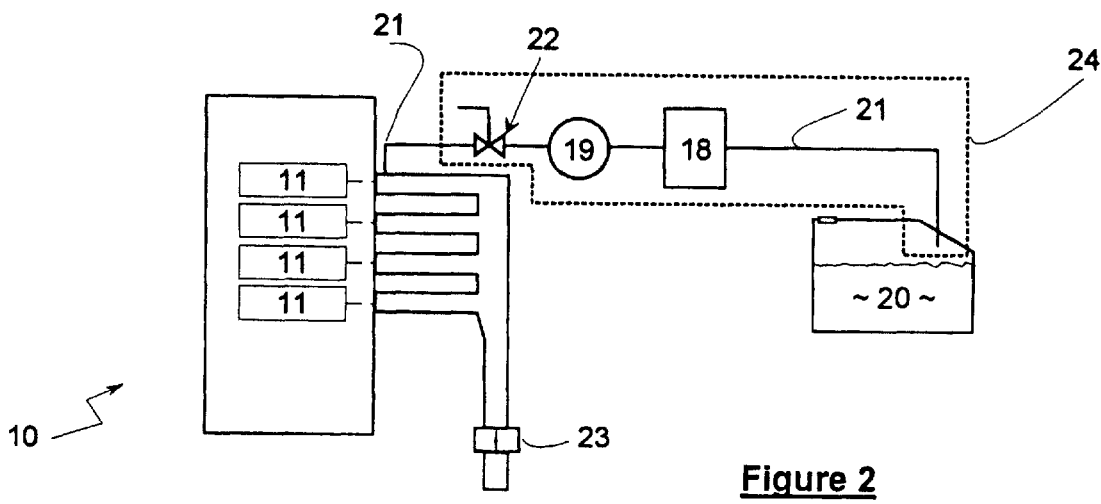
FIG. 2 is a diagrammatic view of a filter regenerating device according to the invention.

The filter 18 (FIG. 2) is designed to store the fuel vapors originating from a fuel tank 20. These vapors are conveyed toward the filter by a discharge line 21. Also mounted on this discharge line 21 are the discharge pump 19 and the discharge valve 22. The discharge line 21 opens out as close as possible to the inlet valve of at least one of the cylinders 11.

When the filter 18 is saturated, it has to be regenerated. For this purpose, the filter is equipped with a vent opening. The pump 19 creates a depression inside the filter. Air therefore enters the filter and purges it. This allows the fuel vapors trapped by the filter to be released. The discharge value 22 then need merely be made to open for the fuel vapors to be introduced into the cylinder 11.

According to the invention, the process for regenerating a fuel vapor filter comprises, while the engine is operating on stratified charge, the following steps:

authorizing the opening of the discharge valve when the degree of saturation of the filter exceeds a threshold value. This threshold value may vary between a saturation level of 0% to 100%. When the level is set at 0%, filter regeneration occurs continuously, and when it is set at 100%, this regeneration occurs only when the filter is fully saturated, letting the fuel vapors into at least one of the cylinders. It is actually possible, according to the invention, to choose one single cylinder which, each time regeneration is to occur, will receive the fuel vapors. Alternatively, each of the engine cylinders in turn becomes the one to receive the fuel vapors. As yet another alternative, several cylinders (but not all of the cylinders) receive the fuel vapors at the same time, homogeneous combustion of the fuel vapors present in the cylinder (or cylinders) receiving the fuel vapors. Thus, whereas the other cylinders of the engine continue to operate on stratified charge, the one (or ones) receiving the fuel vapors performs homogenous combustion of the mixture. Homogenous combustion is characterized by a mixture which, throughout the volume of the combustion chamber, has similar richness. In this combustion mode, there is no zone of greater richness.

For homogenous combustion of the mixture, the fuel (metered as a function of the amount of air let in) need merely be injected at the time the inlet valve opens. Thus, the air laden with fuel vapors enters the chamber at the same time as the fuel injected by the injector. This causes agitated mixing of the mixture contained in the chamber. The mixture obtained has homogeneous richness. After all the fuel vapors originating from the filter have been burnt, the cylinder which received these vapors returns to stratified charge operation.

The benefit of performing homogeneous combustion of the mixture lies in the fact that the air entering the cylinder already carries fuel and that to cause this fuel to burn, combustion of the mixture needs to occur throughout the volume of the combustion chamber. If merely stratified charge combustion had taken place, then what would happen would be that the fuel injected in the region of the spark plug would burn, but the fuel present within the combustion chamber would burn only very partially. This would therefore result in increased pollution because the exhaust gases would contain unburned hydrocarbons. By performing homogeneous combustion in the cylinder receiving the fuel vapors, it is possible to guarantee complete combustion of the fuel vapors introduced, and to do so even while the mixture within this cylinder is lean overall.

In order that the different mode of combustion performed in the cylinder receiving the fuel vapors should not, overall, disturb the operation in stratified charge mode of the remaining cylinders, the value of the torque delivered by the cylinder receiving the fuel vapors is monitored. If this torque is higher than the torque from the other cylinders operating in stratified charge mode, then the spark plug ignition instant of the cylinder receiving the fuel vapors is modified to correspondingly alter the torque. The ignition advance is therefore increased. The torque thus modified becomes similar to the torques from the other cylinders. The operation of the engine is therefore disturbed very little by the operation of the cylinder receiving the fuel vapors. If the torque delivered by the cylinder receiving the vapors is lower than the torques delivered by the other cylinders, the mixture is enriched by altering the injection period. Thus, it is possible to prevent the homogeneous combustion in one cylinder from disturbing the resulting engine torque.

The engine torque is thus managed by managing the ignition instant, or by managing the injection period.

It will also be noted that the switch between cylinder operating mode (homogeneous or stratified charge) is performed by managing the moment at which the fuel is injected.

To implement the process of the invention, the filter regenerating device is somewhat modified compared with a conventional device like the ones used in indirect injection engines.

The device 24 according to the invention in particular comprises a discharge pump 19. Furthermore, the end of the discharge line 21 (FIG. 2) is as close as possible to the inlet valve of the cylinder receiving the fuel vapors.

When this cylinder is chosen once and for all (the scenario depicted in FIG. 2), the discharge line 21 leads into the inlet port of this cylinder.

When several cylinders, determined once and for all, may simultaneously or otherwise receive the fuel vapors, the discharge line 21 has an end in the region of each of these cylinders. If appropriate, each of these ends may be fitted with a discharge valve.

When each one of the cylinders may, cyclically, receive the fuel vapors, the discharge line has as many ends as there are cylinders.

It will be noted that the discharge valve 22 may be a proportional opening valve or a valve the opening and closing of which are synchronized with those of the valve of the cylinder(s) receiving the fuel vapors.

Of course, the present invention is not restricted to the embodiments described herein above and encompasses any alternative form that is within the competence of the person skilled in the art. Thus, the discharge pump could be arranged upstream of the fuel vapor filter if it had a port for drawing in ambient air.

What is claimed is:

1. A fuel vapor filter regeneration process for a direct injection engine of the type having:

a plurality of cylinders supplied directly with fuel;

a filter for collecting fuel vapors at a fuel tank; and a fuel vapor discharge line fitted with a fuel vapor discharge valve, and a pump associated with the line for discharging the fuel vapors stored in the filter and for conveying the fuel vapors towards the cylinders;

the process which comprises, while the engine is operating on stratified charge, the following steps:

opening the fuel vapor discharge valve when a degree of saturation of the filter exceeds a given threshold;

allowing the fuel vapors to enter at least one of the cylinders but not simultaneously all of the cylinders;

p2 cyclically determining the cylinder receiving the fuel vapors such that each cylinder of the plurality of cylinders receives fuel vapor in turn; and homogeneously combusting the fuel vapors in the respective cylinder.

2. The process according to claim 1, which further comprises:

monitoring a value of a torque output by the cylinder receiving the fuel vapor; and managing one of an ignition advance of the cylinder receiving the fuel vapor and a fuel injection period such that the torque output by the respective cylinder receiving the fuel vapor is similar to torques output from the other cylinders.

3. The process according to claim 1, wherein the allowing step comprises letting the fuel vapors enter a single cylinder.

4. The process according to claim 1, which comprises managing an instant of fuel injection for defining a homogeneous combustion.

5. A device for regenerating a fuel vapor filter for an internal combustion engine with a plurality of cylinders, comprising:

a fuel vapor filter for storing fuel vapors originating from a fuel tank;

a fuel vapor discharge line communicating with said filter for conveying the fuel vapors from the filter to an immediate vicinity of a plurality of cylinders of an internal combustion engine;

a discharge valve mounted at said fuel vapor discharge line in the vicinity of the cylinders;

a fuel vapor discharge pump connected to cause the fuel vapors to circulate between the filter and the cylinders when an opening of said saturation valve is authorized, whereby the vapors are introduced into at least one of the cylinders, but not simultaneously into all of the plurality of cylinders, said at least one of the cylinders being cyclically determined from said plurality of cylinders such that each cylinder of the plurality of cylinders receives fuel vapor in turn.

6. The device according to claim 5, wherein said discharge valve is adapted to open and close in synchronism with an inlet valve of the respective cylinder receiving the fuel vapors.

7. The device according to claim 5, wherein said discharge valve is a valve with proportional opening.

* * * * *